United States Patent
Grigg et al.

(10) Patent No.: US 8,694,456 B2
(45) Date of Patent: Apr. 8, 2014

(54) PREDICTING FUTURE TRAVEL BASED ON A USER'S HISTORICAL FINANCIAL INSTITUTION TRANSACTION DATA AND PROVIDING OFFERS BASED ON THE PREDICTED FUTURE TRAVEL

(75) Inventors: David M. Grigg, Rock Hill, SC (US); Matthew A. Calman, Charlotte, NC (US); Raja Bose, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 262 days.

(21) Appl. No.: 13/213,885

(22) Filed: Aug. 19, 2011

(65) Prior Publication Data

US 2013/0046717 A1 Feb. 21, 2013

(51) Int. Cl.
G06N 5/02 (2006.01)
(52) U.S. Cl.
USPC .......................................................... 706/46
(58) Field of Classification Search
None
See application file for complete search history.

(56) References Cited

U.S. PATENT DOCUMENTS

| | | | |
|---|---|---|---|
| 5,948,040 A * | 9/1999 | DeLorme et al. | 701/426 |
| 6,430,539 B1 * | 8/2002 | Lazarus et al. | 705/7.31 |
| 8,005,753 B2 * | 8/2011 | Davis | 705/39 |
| 8,255,268 B2 * | 8/2012 | Rane et al. | 705/7.33 |
| 8,359,274 B2 * | 1/2013 | Yoder et al. | 705/64 |
| 2007/0244741 A1 * | 10/2007 | Blume et al. | 705/10 |
| 2008/0167887 A1 * | 7/2008 | Marcken | 705/1 |
| 2009/0157307 A1 * | 6/2009 | Krumm et al. | 701/209 |
| 2010/0161379 A1 * | 6/2010 | Bene et al. | 705/10 |
| 2010/0217525 A1 * | 8/2010 | King et al. | 701/300 |
| 2011/0004497 A1 * | 1/2011 | Mortimore et al. | 705/5 |
| 2013/0080239 A1 * | 3/2013 | Okerlund | 705/14.33 |

* cited by examiner

*Primary Examiner* — Jeffrey A Gaffin
*Assistant Examiner* — Dave Misir
(74) *Attorney, Agent, or Firm* — Michael A. Springs; Moore & Van Allen, PLLC; James C. Edwards

(57) ABSTRACT

Methods, apparatus and computer-program products are described for providing travel-location merchant offers to users who are determined to be travelling based on Point-Of-Sale (POS) transaction data. Embodiments of the invention compare the location of the POS transaction to the user's domicile location and if the transaction occurs a predetermined distance or greater from the domicile location, the user is determined to be travelling. Once the travelling determination is made, travel-location merchant offers are identified and communicated to the user.

21 Claims, 9 Drawing Sheets

US 8,694,456 B2

PREDICTING FUTURE TRAVEL BASED ON A USER'S HISTORICAL FINANCIAL INSTITUTION TRANSACTION DATA AND PROVIDING OFFERS BASED ON THE PREDICTED FUTURE TRAVEL

FIELD

In general, embodiments of the invention relate to commerce and, more particularly, predicting future travel based on a user's financial institution transaction data and providing travel-related information, such as merchant offers or the like, based on the predicted travel.

BACKGROUND

An individual that is travelling, whether it is business-related travel, leisure travel or a combination of both, is often facing the daunting task of trying to become comfortable with their travel location surroundings. In many instances, the traveler faced with a locale that they are unfamiliar with is unaware of where businesses/merchants, such as restaurants, shopping centers/malls or the like, are located. Moreover, the traveler may be unaware of which businesses, merchants or service providers in the travel location offer discounts or the like.

From the alternate perspective, businesses/merchants know that the traveler may be more likely and more immediately likely to use their business than local residents. For example, travelers are more prone to dine out, engage in entertainment activities and the like, than their local resident counterparts. As a means of enticing the traveler, business/merchants may be more willing to offer the traveler a discount/offer or more substantial discount/offer than they would otherwise offer to the local residents. However, the business/merchant will often be unaware of which individuals are travelers and which individuals are local residents. In addition, unless the business/merchant resorts to conventional strategies, such as handing out flyers on street corners or the like, the business/merchants may not be capable of making travelers aware of their business.

Therefore, a need exists to develop systems and method for identifying individuals as travelers and, based on the identification, providing merchant offers to the travelers. A further need exists to tailor the merchant offers such that they are traveler-specific, taking into account what the traveler typically purchases when travelling or when located proximate their residence. In additional need exists, to provide other information/offers for services to the traveler, specifically financial institution-related information/offers based on identifying an individual as a traveler. Moreover, a further need exists to ascertain an individual's travel history, including preferences, patterns and the like, so as to predict future travel and provide necessary information and offers in advance of the predicted travel.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Thus, further details are provided below for predicting a user's future travel based on their historical financial institution transaction data and, once future travel has been predicted, providing the user with travel-related information, such as merchant offers or the like, in advance of the travel.

A method for providing travel-related information to a predicted traveler provides for first embodiments of the invention. The method includes retrieving a user's historical financial institution transaction data including historical travel data and predicting the user's future travel based on the historical travel data. The method further includes identifying travel-related information associated with the predicted future travel and communicating the travel-related information to the user.

An apparatus configured for providing financial institution travel-related information to a predicted traveler provides for second embodiments of the invention. The apparatus includes a computing platform including a memory and at least one processor in communication with the memory. The apparatus further includes a travel prediction module stored in the memory, executable by the processor and configured to retrieve the user's historical financial institution transaction data including historical travel data and predict the user's future travel based on the historical travel data. In addition, the apparatus includes a travel information module stored in the memory, executable by the processor and configured to identify travel-related information associated with the predicted future travel and initiate communication of the travel-related information to the user.

A computer program product including a non-transitory computer-readable medium defines third embodiments of the invention. The computer-readable medium includes a first set of codes for causing a computer to retrieve a user's historical financial institution transaction data including historical travel data. The computer-readable medium additionally includes a second set of codes for causing a computer to predict future travel for the user based on the historical travel data. Additionally, the computer-readable medium includes a third set of codes for causing a computer to identify travel-related information associated with the predicted future travel. In addition, the computer-readable medium includes a fourth set of codes for causing a computer to initiate communication of the travel-related information to the user.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
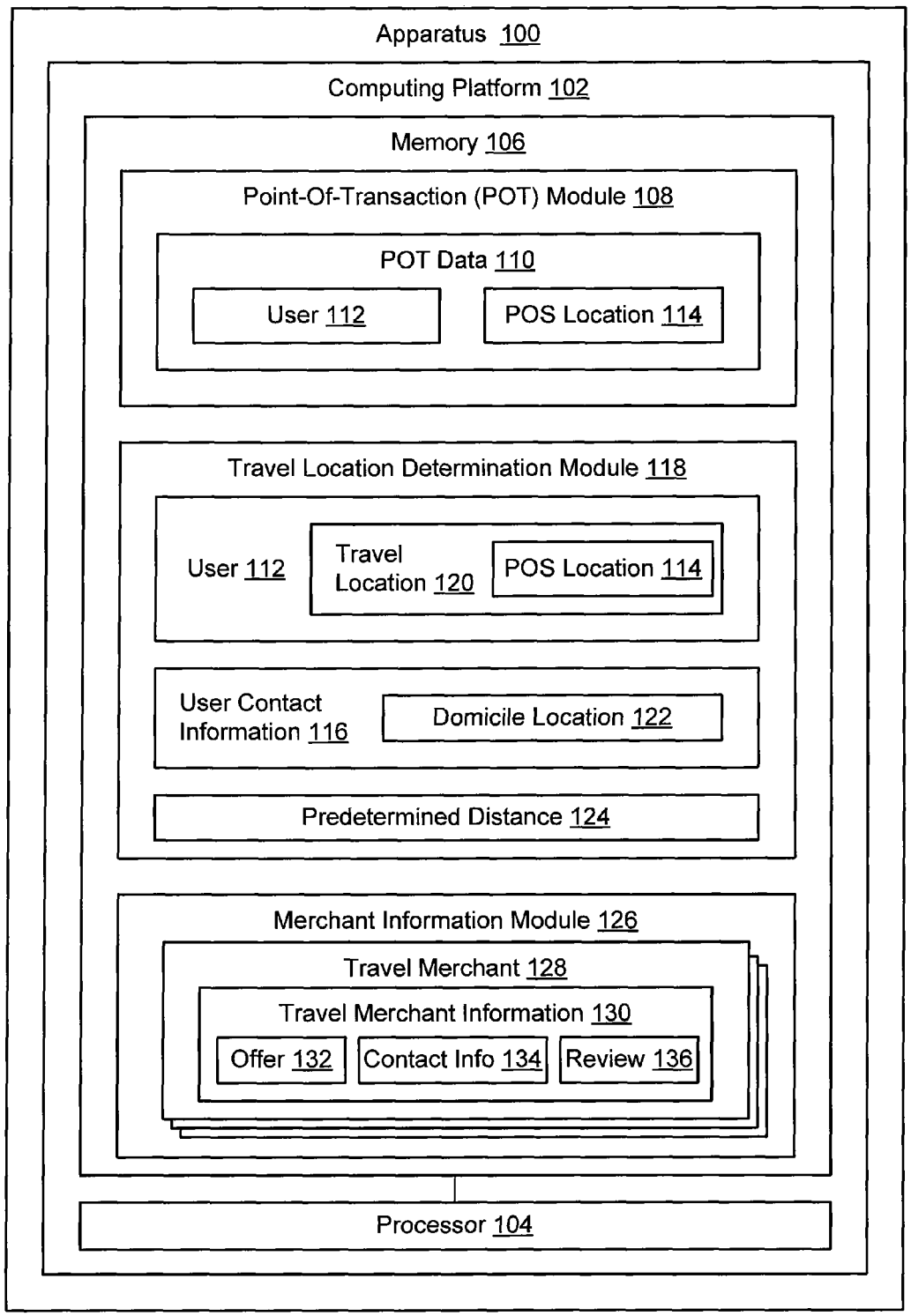
Figure 2:
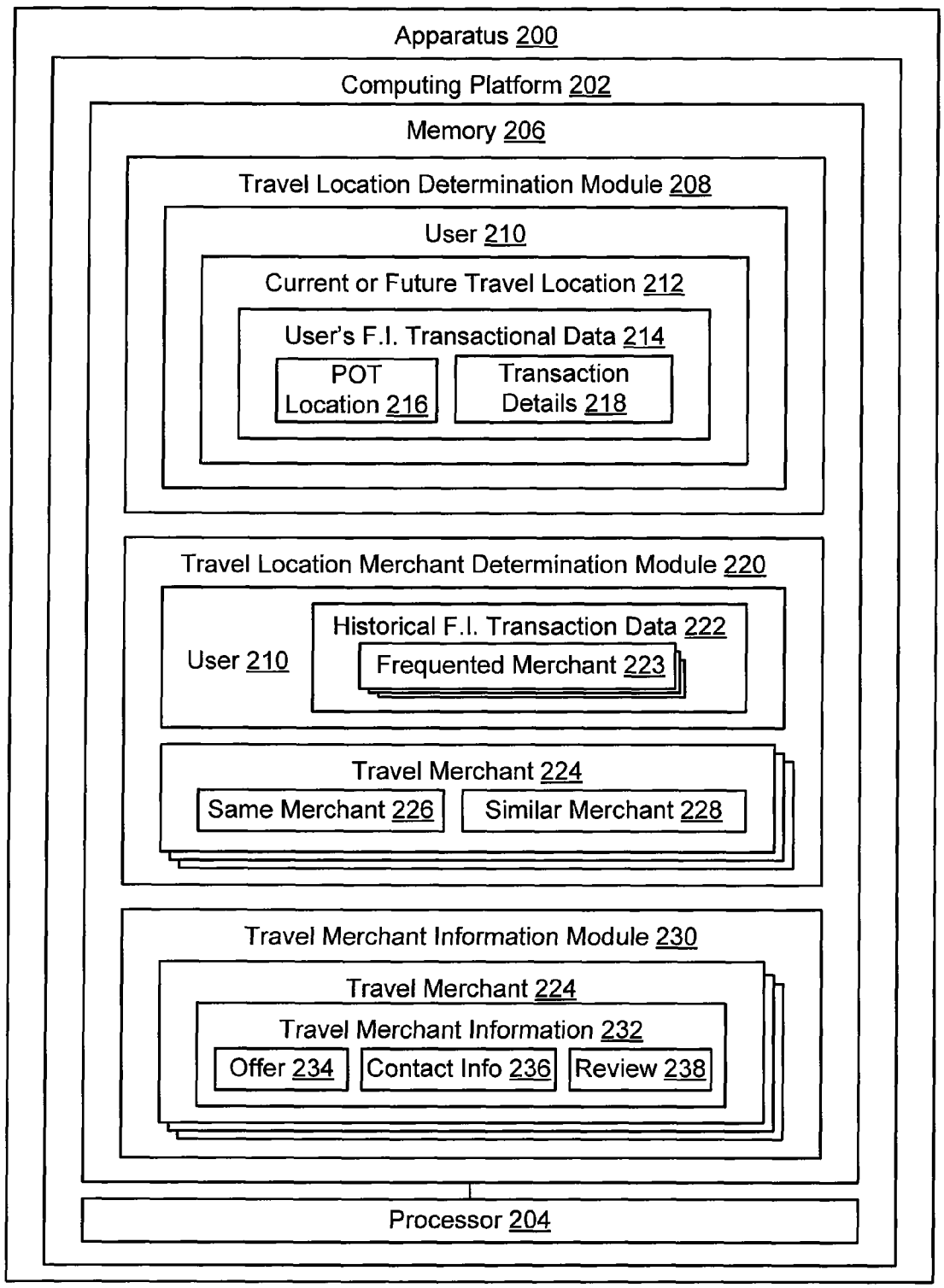
Figure 3:
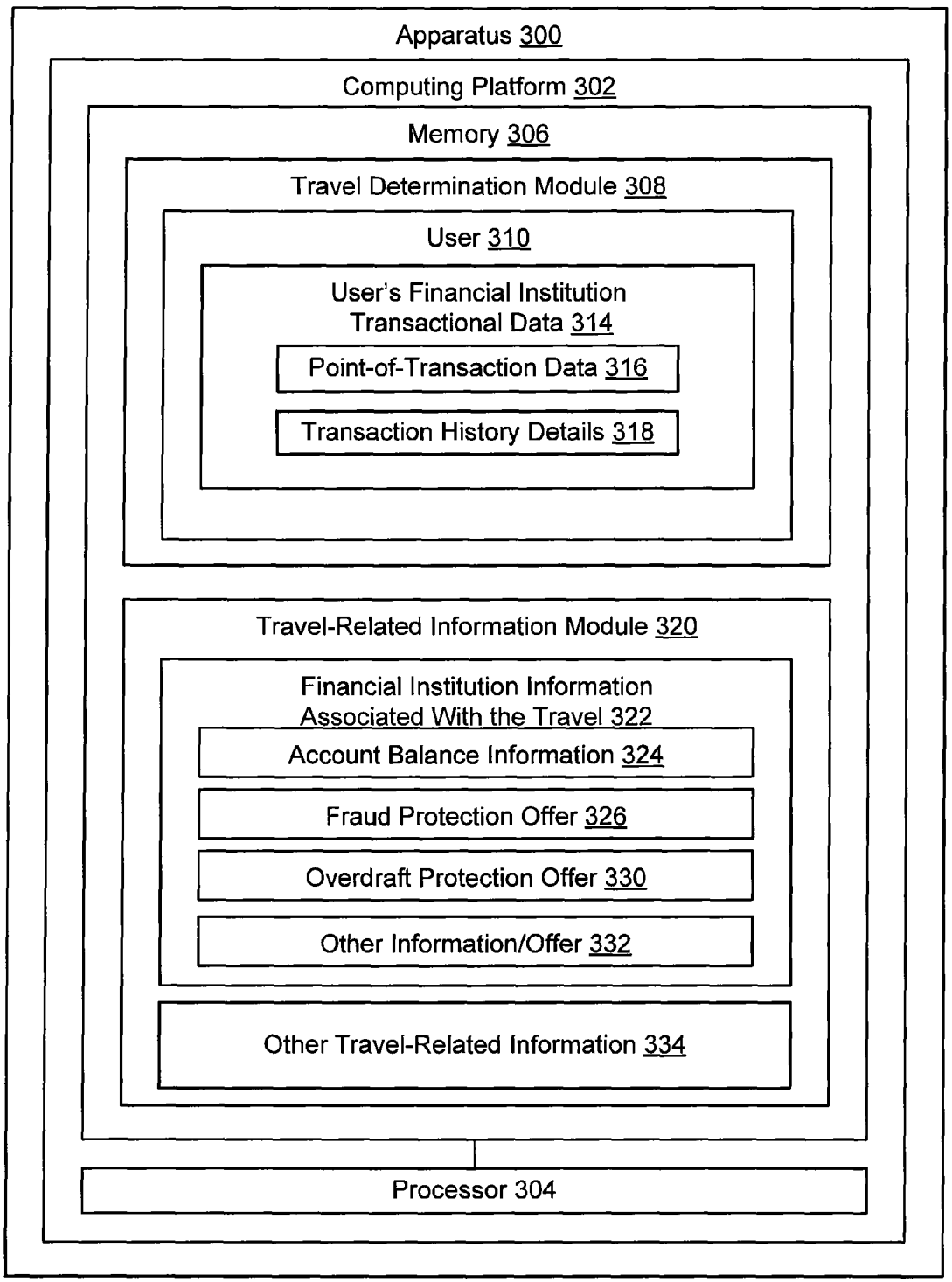
Figure 4:
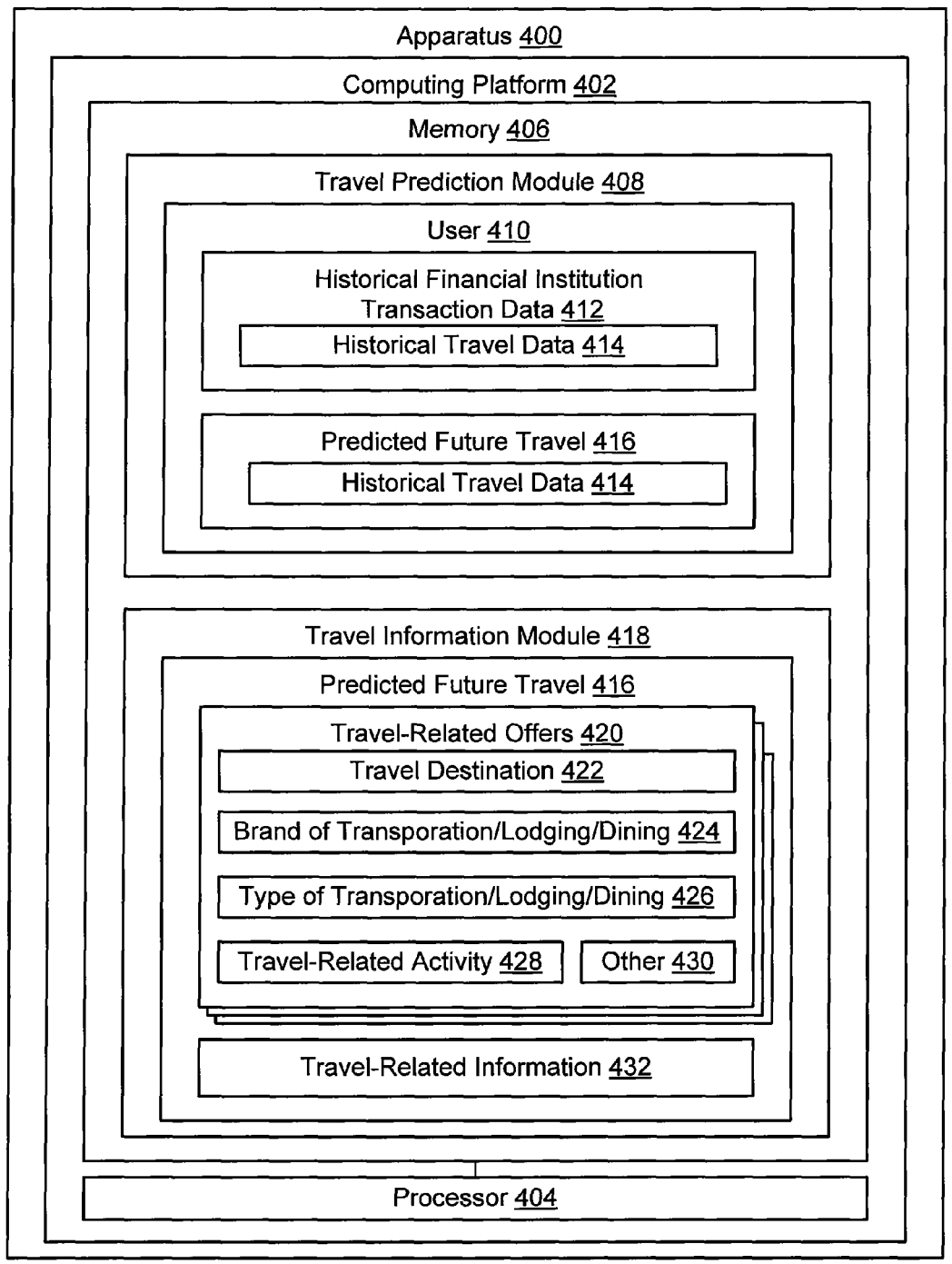
Figure 5:
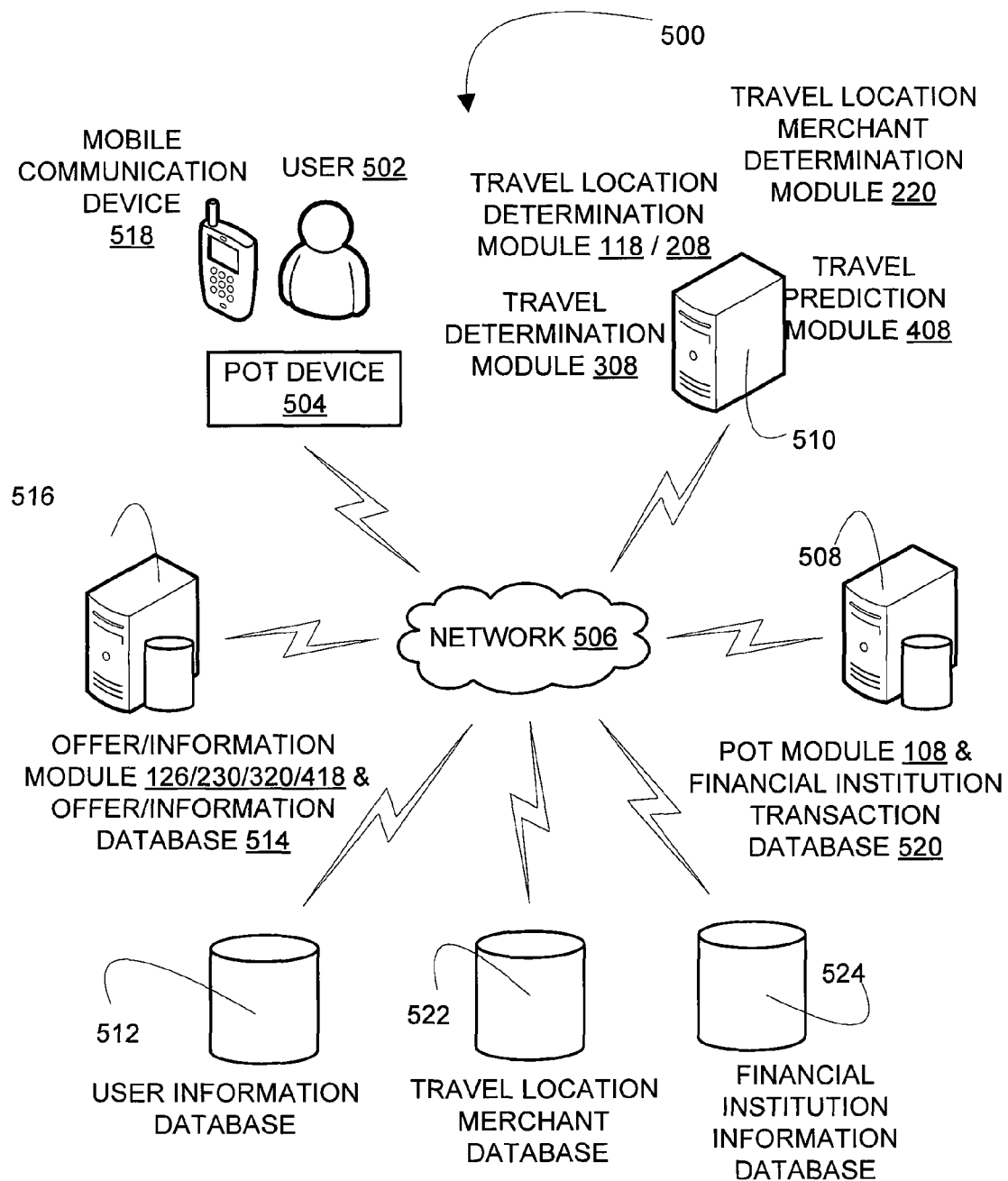
Figure 6:
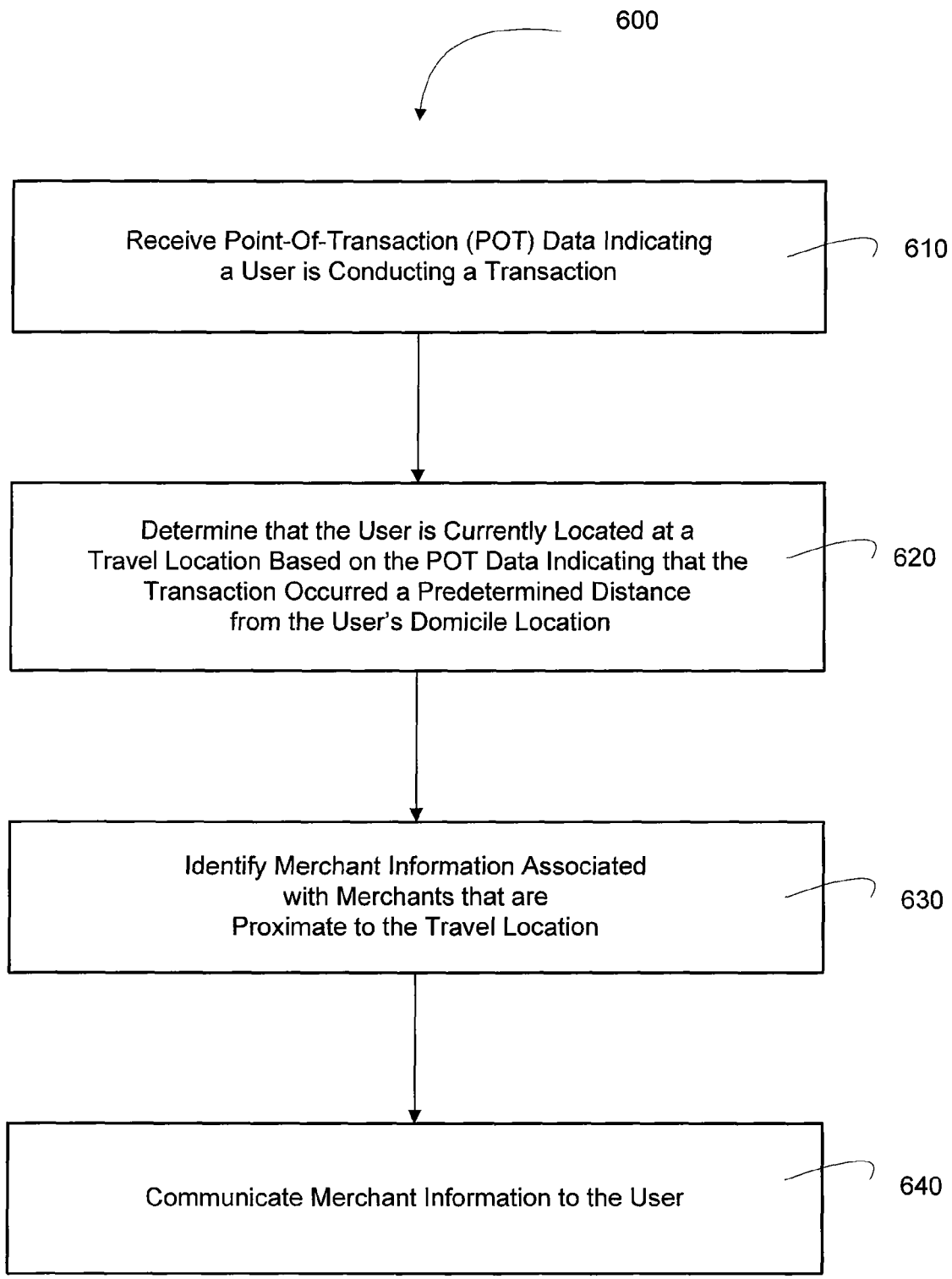
Figure 7:
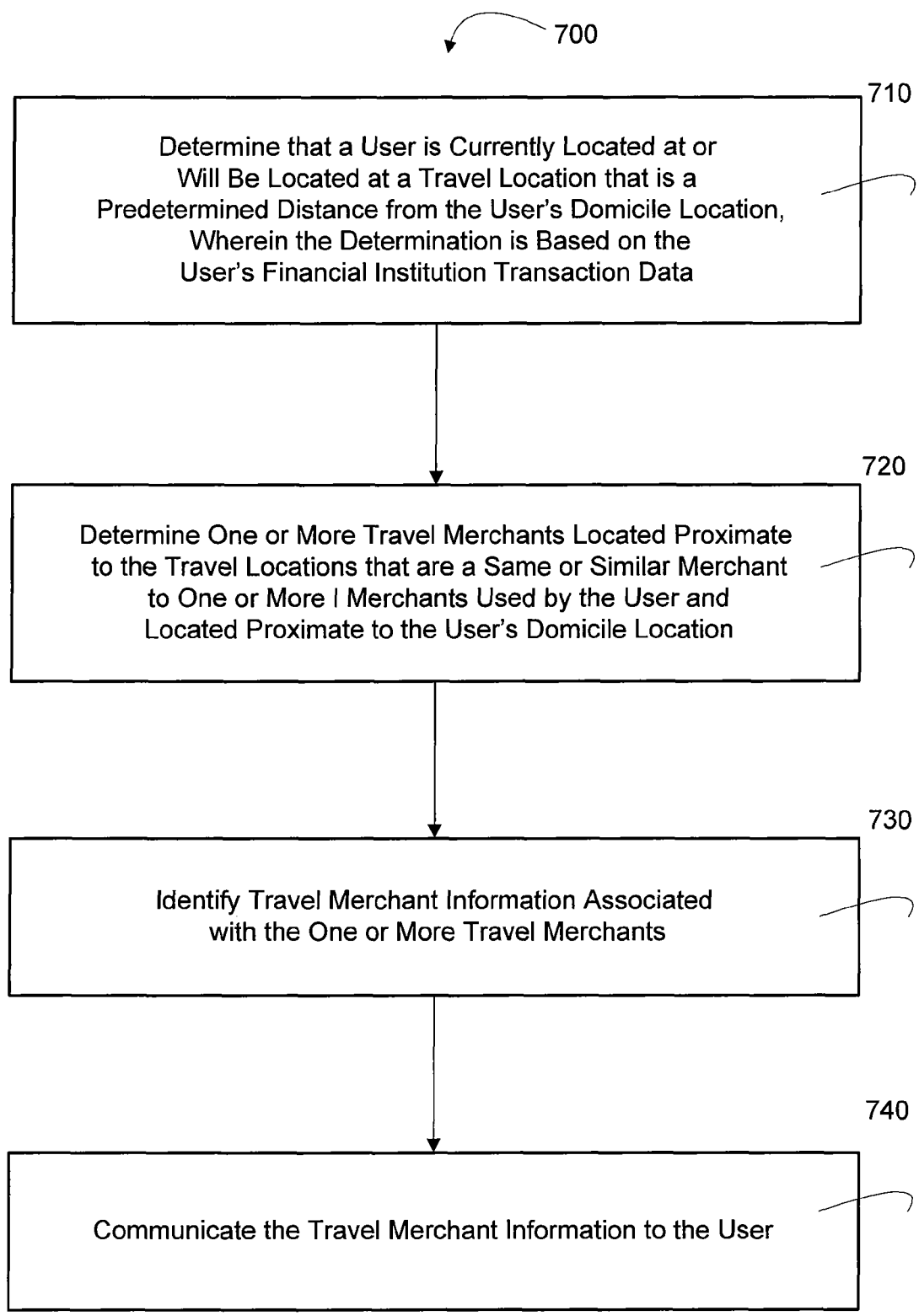
Figure 8:
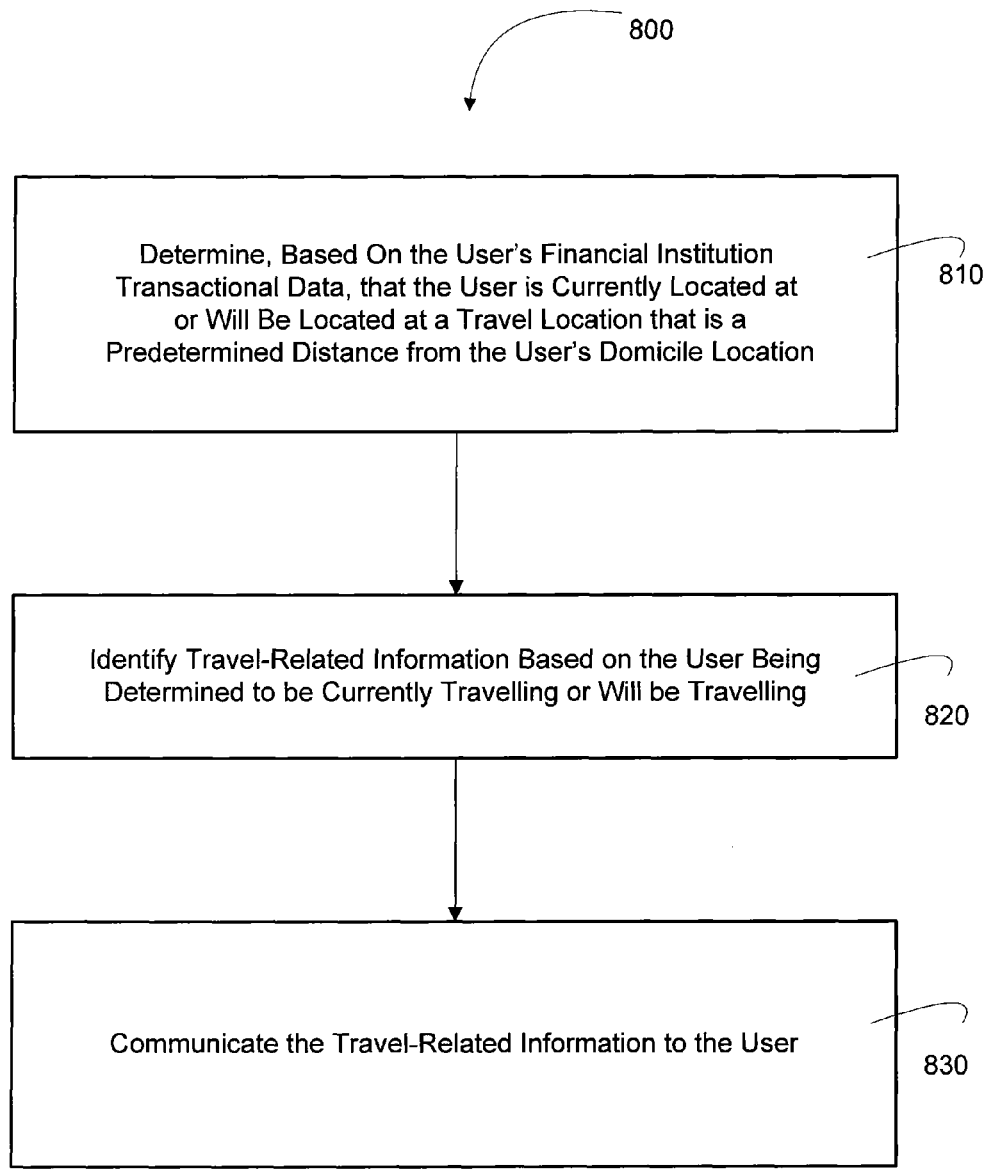
Figure 9:
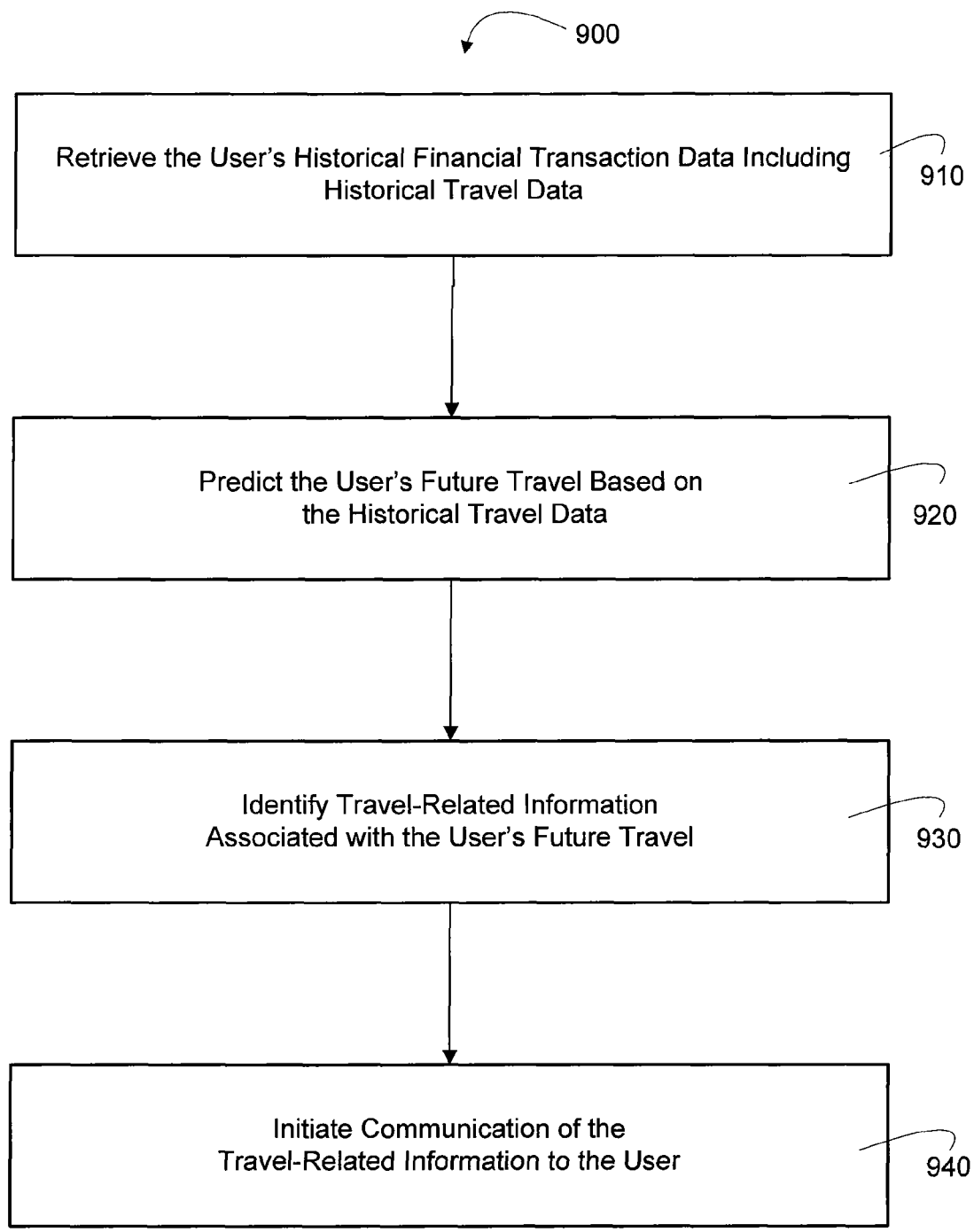

Having thus described embodiments of the invention in general terms, reference may now be made to the accompanying drawings:

i. FIG. 1 is a is block diagram of an apparatus configured for providing merchant offers to travelers based on Point-Of-Transaction (POT) data, in accordance with embodiments of the present invention;

ii. FIG. 2 is a block diagram of an apparatus configured to provide merchant information to travelers, wherein the merchant information is associated with merchants that are the same or similar to merchant's that the traveler uses in their domicile location, in accordance with embodiments of the present invention;

iii. FIG. 3 is a block diagram of an apparatus configured for providing financial institution-associated, travel-related information to users determined to be travelling, in accordance with embodiments of the present invention;

iv. FIG. 4 is block diagram of an apparatus configured to predict future travel for a user and provide travel-related information to the user based on the prediction, in accordance with present embodiments of the invention;

v. FIG. 5 is a schematic diagram of a system for providing information to travelers or would-be travelers, in accordance with present embodiments;

vi. FIG. 6 is a flow diagram of a method for providing merchant offers to travelers based on Point-Of-Transaction (POT) data, in accordance with embodiments of the present invention;

vii. FIG. 7 is a flow diagram of a method for providing merchant information to travelers, wherein the merchant information is associated with merchants that are the same or similar to merchant's that the traveler uses in their domicile location, in accordance with embodiments of the present invention;

viii. FIG. 8 is a flow diagram of a method for providing financial institution-associated, travel-related information to user's determined to be travelling; in accordance with embodiments of the present invention; and ix. FIG. 9 is a flow diagram of a method for predicting future travel for a user and providing travel-related information to the user based on the prediction; in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, or semiconductor system, apparatus, or device. More specific examples of the computer readable medium include, but are not limited to, the following: a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object oriented, scripted or unscripted programming language such as Java, Perl, Smalltalk, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

I. Providing Merchant Offers to Users Determined to be Travelling Based on Point-of-Transaction Data Embodiments of the invention are directed to apparatus, methods and computer program products for identifying a user as a traveler based on Point-Of-Transaction (POT) data that indicates that the user is located a predetermined distance from their domicile location and, based on being identified as a traveler, providing the user with merchant offers specific to the travel location. The POT data may include, but is not limited to, Point-Of-Sale (POS) data, Automated Teller Machine (ATM) data, online banking data, mobile banking data, electronic wallet data or the like. Thus, the POT transaction may include, but is not limited to, a sale, accessing a financial institution application (e.g., a mobile or online application), an account transfer, an account balance inquiry, a loyalty reward redemption, use of an electronic wallet or the like. As such, the POT device, from which the POT data emanates, may be a cash register, a POS/card reader terminal, an ATM, a smart phone, a computing device, such as personal computer, laptop or the like.

As such, once a user initiates a POT transaction, such as a POS debit or credit card transaction, an ATM transaction or the like, the POT data transmitted to a receiving entity, such as a financial institution, indicates or allows for determination of the location of the transaction. In specific embodiments, the receiving entity compares the location of the transaction to the domicile (i.e., home or residence) location of the user, such as by accessing the user's stored contact information or the like, to determine if the user is travelling (i.e., located a predetermined distance from the domicile location). Once the traveler determination is made, travel location-specific merchant information, such as offers, reviews or the like can be pushed (i.e., communicated), in some instances instantaneously, to the user via electronic mail (i.e., email), SMS/text or the like.

It should be noted that in specific embodiments of the invention location determination is solely based on POT data and, as such, does not implement any other location-determining means, such as Global Positioning System (GPS), wireless network triangulation, sensors or the like. As such, the user is not required to be in possession of a mobile communication device at the time of the transaction or, stated otherwise, at the time that user is determined to be travelling. In other embodiments of the invention, location determination may be based on POT data in combination with other location-determining means, such as GPS, triangulation, sensors, such as a gyroscope, an earth magnetic field sensor, an air-pressure sensor or the like. In still further embodiments of the invention, location determination may include determination of the of user movement, for example if the user is travelling via a vehicle, such as an automobile and/or the direction of the movement. In such embodiments, location determination may be based on POT data in combination with movement and directional determining means, such as accelerometers, compasses and the like.

FIG. 1 is a block diagram of an apparatus 100 configured to provide merchant information, such as offers to users determined to be travelling based on Point-Of-Transaction (POT) data, in accordance with embodiments of the present invention. The apparatus includes a computing platform 102 having at least one processor 104 and a memory 106 in communication with processor 106. The memory 104 of apparatus 100 stores POT module 108 that is configured to receive POT data 110, such as debit or credit POS transaction data, ATM transaction data or the like during the transaction process. Receipt of the POT data 100 by the transaction authorizing entity, such as a financial institution or the like, serves to identify the user 112, by the account number associated with the credit or debit account or the like and identify the POT location 116 of the transaction. The POT location 116 of the transaction may be identified by mapping the identifier associated with the POT device to a geographic location of the POT device or the POT device identifier may, in and of itself, provide for the identity of the geographic location of the POT device.

The memory 106 of apparatus 100 additionally includes travel determination module 118 that is configured to determine that the user 112 is currently located at a travel location 120 based on the transaction occurring a predetermined distance 124 from the user's domicile location 122. In specific embodiments, the travel determination module 118 is configured to access the user's contact information 116, stored in database, such as an account database or a user contact information database, and compare the domicile/residence location 122 listed in the contact information with the POT location 116. If the POT location 116 is determined to be a predetermined distance 124 or greater from the domicile location 122, the user is determined to be at a travel location 120. The predetermined distance may be preconfigured by the system provider or, in other embodiments, the predetermined distance may be preconfigured by the user, such that the user controls the distance at which the user is determined to be traveler. Examples of predetermined distances, which are provided merely as examples and are not limiting, include 50 miles (approximately 80 kilometers), 100 miles (approximately 160 kilometers) and the like. Additionally, in other embodiments, the user may be provided the ability to enable/disable the travel determination module and, as such, enable/disable the communication of merchant information to the user when the user is determined to be travelling.

In addition, travel determination module 118 may be configured to determine that a user is currently in transit to a final travel location based on POT data and other data, such as movement and direction data, which may be acquired from an accelerometer, compass or the like. Thus, if a user conducts a POT transaction and corresponding movement information indicates that the user is currently travelling via vehicle to a final travel location, travel merchant information may not be identified until the final travel location is determined (e.g., based on multiple instances of POT data at the final travel destination and/or POT data and relatively stationary movement information).

Additionally, the memory 106 of apparatus 100 includes travel merchant information module 126 that is configured to identify one or more merchant information items 128 associated with the merchants 130 located proximate to the travel location 120 and initiate communication of the travel merchant information 130 to the user 112. The travel merchant information may include, but is not limited to merchant offers 132, contact information 134, such as merchant address, telephone numbers and the like; and merchant reviews 136. The term "merchant offers" 132 includes any offer, discount, advertisement or the like for a product or service offered by the merchant or a general offer, discount, advertisement for the merchant.

The term "proximate to the travel location" may be defined as within the city, county or state boundaries of the travel location 120 or within a predetermined radius of the travel location 120. In specific embodiments, the system may define what is proximate to the travel location 120 while in other embodiments the user may define what is proximate to the travel location 120 by defining the predetermined radius or the like.

In specific embodiments of the invention, the merchant offers 132 that are identified are associated with merchants that are affiliated with a financial institution that conducted or is otherwise associated with the user's transaction and/or the user's financial transaction data. Such an affiliation may provide for the merchant to compensate or provide other consideration to the financial institution based on the communication of a merchant offer 132 to the user and/or the user's acceptance/use of a merchant offer 132.

In further embodiments of the invention, the merchant offers 132 may be bundled or packaged such that the user may need to redeem or accept all offers in the package in order to realize the discount or realize the highest discount possible. In such embodiments, the packaged or bundled merchant offers 132 may be user-specific merchant offers 132, as described infra.

In other specific embodiments of the invention, the merchant information 130 may be based on product or service type associated with the location-determining transaction. For example, if the location determining transaction is associated with a fuel purchase the merchant information 130 may be a merchant offer 132 for a discount at the convenience store associated with the fuel provider. In another example, if the location-determining transaction is hotel lodging the merchant information 130 may be for additional services at the hotel, dining/room service, spa services or the like, or the merchant information 130 may indicate restaurants in close proximity to the hotel.

In further specific embodiments, the merchant information 130 that is identified may be user-specific merchant information 130. In such embodiments, the merchant information 130, such as merchant offers 132 may additionally be based on the product or service type associated with the location-determining transaction. In such embodiments, the user-specific merchant information may be determined based on the user's historical financial institution transaction data. For example, the transaction data may indicate based on a volume and/or rate of transactions, the user's preference for a particular product or service type. As such, in particular embodiments of the invention, the user-specific merchant information may be associated with a particular service or product type preferred by the user. In other example, the transaction data may indicate the user's preferred price range for a product or service. As such, in particular embodiments of the invention, the user-specific merchant information, such as offers or the like may be associated with products or services within the preferred price range or the discount/offer may be configured to meet the user's preferred price range for a product/service.

In still further embodiments of the invention, the merchant information module 126 may be configured to determine merchants located proximate to the travel location 120 that are the same or similar to merchants proximate to the user's domicile location and frequented by the user. The travel-located merchants may be similar in brand, similar in the products or services offered and/or similar in terms of pricing of products or offers. In such embodiments, the merchant information that is identified and communicated to the user may be merchant information, such as offers or the like, provided by the travel-located merchants that are the same or similar to the user's domicile location and frequented by the user.

In those embodiments in which the module 126 identifies merchant reviews 136, the merchant reviews 136 may be user-specific merchant reviews, for example, reviews provided by individuals know or otherwise associated with the user. User-specific merchant reviews may rely on social networking websites or the like to determine who is known or otherwise associated with the user.

Once the merchant information 130 has been identified, the merchant information module 126 initiates communication of the information to the user. The system or the user may configure for merchant information to be communicated by one or more designated communication mechanisms, such electronic mail (email), Short Message Service (SMS)/text or the like. In specific embodiments of the invention, merchant information communication may commence shortly after the travel location has been determined (e.g., shortly after the transaction occurs at the travel location). The system may be configured to communicate all the identified merchant information, such as multiple merchant offers at one time or the system may be configured to communicate the information periodically. Periodic communication of the information may be implemented if the system is aware of the approximate length of the travel, which may be deduced from the POT data 110 (e.g., hotel assessment indicates a length of stay at the travel location, while a fuel assessment indicates a fleeting stay at the travel location). In addition, the type of merchant or the type of information/offer may dictate when the communication is sent to the user (e.g., a breakfast bistro offer may be sent in the morning a happy hour offer may be sent late-afternoon).

In addition to communicating the merchant information 130 to the user, the merchant information module 126 may be configured to communicate the merchant information 130 to individuals related to the user, such as friends or family members. In such instances the user may configure the system so as to identify which related individuals should receive merchant information upon determination that the user is travelling or the system may be configured to determine which related individuals are also travelling with the user based on financial institution transaction data and/or other known location determining means, such as GPS, triangulation, sensors or the like. In addition, the system may be configured to predict which related individuals are travelling with the user based on historical financial institution transaction data.

It should be noted that while in most instances, the merchant information 130 will be received by the user via a mobile device, in other instances, such as when the merchant information 130 is communicated via email or the like, the merchant information 130 may be received by the user via a non-mobile communication device, such as a personal computer or the like.

In specific embodiments, once the merchant information 130 has been communicated and received by the user, the user may choose to forward the information to friends, family members or the like. In one particular instance, sharing of the merchant information 130 may be accomplished by posting the information on a social network web site or the like.

II. Determining Merchants in a Travel Location that are the Same or Similar to Merchants Used by a User and Providing Same or Similar Merchant Information to the User.

Further embodiments of the invention are directed to apparatus, methods and computer program products for identifying a current or future travel location of a user based on the user's financial institution transaction data, determining merchants at the travel location that are the same or similar to merchants frequented by the user, identifying travel merchant information, such as offers, associated with the same or similar merchants and communicating the travel merchant information to the user. As such, presently described embodiments eliminate the need for the traveler, who may be unfamiliar with the travel location, to research what merchants are in the area that they might be interested in. By relying on financial institution transaction history to determine what types of merchants a user has shown a preference for in the past, the present invention can determine which merchants are the same or similar in the travel location and provide the user with information related to these merchants such as offers or the like.

It should be noted that the certain described embodiments rely solely on the user's financial institution transaction data to determine location and, as such, does not implement any other location-determining means, such as Global Positioning System (GPS), wireless network triangulation, sensors or the like. As such, the user is not required to be in possession of a mobile communication device at the time of the transaction or, stated otherwise, at the time that a user is determined to be travelling. In other embodiments of the invention, location determination may be based on financial institution transaction data in combination with other location-determining means, such as GPS, triangulation, sensors, such as a gyroscope, an earth magnetic field sensor, an air-pressure sensor or the like. In still further embodiments of the invention, location determination may include determination of the of user movement, for example if the user is travelling via a vehicle, such as an automobile and/or the direction of the movement. In such embodiments, location determination may be based on POT data in combination with movement and directional determining means, such as accelerometers, compasses and the like.

FIG. 2 is a block diagram of an apparatus 200 configured to determine merchants in a travel location that are the same or similar to merchants frequented by a user and provide merchant information from the same or similar merchants to the user, in accordance with embodiments of the present invention. The apparatus includes a computing platform 202 having at least one processor 204 and a memory 206 in communication with processor 204. The memory 206 of apparatus 200 stores travel location determination module 208 that is configured to determine a current or future travel location 212 for a user 210, wherein the determination is based on the user's financial institution transactional data.

In one embodiment of the invention, the travel location determination module 208 is configured to receive POT data, such as POS debit or credit transaction data, ATM data or the like. Receipt of the POT data by the transaction receiving entity, such as a financial institution or the like, serves to identify the user 210, by the account number associated with the credit or debit account, the personal identification number/code used for the ATM transaction or the like and identify the location 216 of the transaction. The location 216 of the transaction may be identified by mapping the identifier associated with the POT device to geographic locations of the POT devices or the POT device identifier may, in and of itself, provide for the identity of the geographic location of the POT device. The travel location determination module 208 is further configured to determine that the POT location 216 is a current travel location 212 based on the transaction occurring a predetermined distance from the user's domicile location. The travel location determination module 208 may be configured to access the user's contact information, stored in a database, such as an account database or a user contact information database, and compare the domicile/residence location listed in the contact information with the POT location 216. If the POT location 216 is determined to be a predetermined distance or greater from the domicile location, the user is determined to be at a travel location 212. The predetermined distance may be preconfigured by the system provider or, in other embodiments, the predetermined distance may be preconfigured by the user, such that the user controls the distance at which the user is determined to be a traveler.

In addition, travel location determination module 208 may be configured to determine that a user is currently in transit to a final travel location based on POT data and other data, such as movement and directional data, which may be acquired from an accelerometer, compass or the like. Thus, if a user conducts a POT transaction and corresponding movement information indicates that the user is currently travelling via vehicle to a final travel location, travel merchant information may not be identified until the final travel location is determined (e.g., based on multiple instances of POT data at the final travel destination and/or POT data and relatively stationary movement information).

In other embodiments of the invention the travel location determination module 208 is configured to determine a future travel location for the user based on transaction details 218 in the user's financial transactional data 214. For example, the transaction details 218, which indicate a travel location may include, but are not limited to, an airline ticket purchase/reservation, a lodging purchase/reservation, a car rental purchase/reservation or the like. Such transaction details 218 may not only provide for indication of the future travel location 212 but also provide for the time period of the pending travel. Information regarding the time period of the pending/future travel may be instrumental in timing the communication of the travel merchant information (i.e., communicating merchant offers proximate to the start of the travel).

Memory 206 of apparatus 200 additionally includes travel location merchant determination module 220 that is configured to determine one or more travel merchants 224 located proximate to the travel location that are a same or similar merchant to one or merchants frequented by the user. The term "proximate to the travel location" may be defined as within a boundary, such as a city, county or state boundaries of the travel location 212 or within a predetermined radius of the travel location 212 or the like. In specific embodiments, the system may define what is proximate to the travel location 120 while in other embodiments the user may define what is proximate to the travel location 120 by defining the predetermined radius or the like.

In specific embodiments, the travel location merchant determination module 220 accesses the user's financial transaction data 222, such as debit/credit/checking account purchase data or the like to determine frequented merchants 223. A "frequented merchant" may be any merchant that the user 210 has frequented (i.e., conducted a transaction at) within a predetermined time period (e.g., the last 30 days, 180 days, year or the like) or, in other embodiments a "frequented merchant" may be any merchant that the user 210 has frequented a predetermined number of times during a predetermined time period. It should also be noted that the term "frequented merchant" is not limited to a single location or entity and, as such, a "frequented merchant" may include multiple locations of a merchant brand (e.g., multiple locations of a restaurant chain, car rental agency or the like). A same merchant 226 or similar merchant 228 located at the travel location 212 may be determined based on the frequented merchant 223. A "same merchant" 226 may be determined based on the same brand or another affiliation with the frequented merchant 223. For example, if the user frequents a particular restaurant chain or a particular brand automobile rental agency, the module 220 may identify restaurants in the chain located proximate to the travel location 212 and/or the particular brand automobile rental agency proximate to the travel location 212.

Additionally, the memory 206 of apparatus 200 includes travel merchant information module 230 that is configured to identify one or more merchant information items 232 associated with the travel merchants 224 (i.e., same merchants 226 or similar merchants 228) and initiate communication of the travel merchant information to the user 210. The travel merchant information may include, but is not limited to merchant offers 234, contact information 236, such as merchant address, telephone numbers and the like; and merchant reviews 238. The term "merchant offers" 234 includes any offer, discount, advertisement or the like for a product or service offered by the merchant.

In specific embodiments of the invention, the merchant offers 234 that are identified are associated with merchants that are affiliated with a financial institution that conducted or is otherwise associated with the user's POT transaction and/or the user's financial transaction data. Such an affiliation may provide for the merchant to compensate or provide other consideration to the financial institution based on the communication of a merchant offer 234 to the user and/or the user's acceptance/use of a merchant offer 234.

In further embodiments of the invention, the merchant offers 234 may be bundled or packaged such that the user may need to redeem or accept all offers in the package in order to realize the discount or realize the highest discount possible. In such embodiments, the packaged or bundled merchant offers 234 may be user-specific merchant offers 234, as described infra.

In those embodiments in which the module 230 identifies merchant reviews 238, the merchant reviews may be user-specific merchant reviews, for example, reviews provided by individuals known or otherwise associated with the user. User-specific merchant reviews may rely on social networking websites or the like to determine who is known or otherwise associated with the user.

Once the merchant information 232 has been identified, the travel merchant information module 230 initiates communication of the information to the user. The system or the user may configure for merchant information to be communicated by a designated communication mechanism, such electronic mail (i.e., email), Short Message Service (SMS)/text or the like. The communication may include one or more hyperlinks, which provide for user activation and may, provided the user's device includes the adequate network connectivity, connect the user to the merchant's website or the like. In specific embodiments of the invention, merchant offer communication may commence shortly after the travel location has been determined (e.g., shortly after the location-determining transaction occurs at the travel location 212 or a travel location 212 has been identified from transaction details 218). The system may be configured to communicate all the identified merchant information 232 at one time or the system may be configured to communicate the information periodically. Periodic communication of the information may be implemented if the system is aware of the approximate length of the travel, which may be deduced from the POT data or the historical transaction data. In addition, the type of merchant or the type of information/offer may dictate when the communication is sent to the user.

In addition to communicating the merchant information 232 to the user, the merchant information module 230 may be configured to communicate the merchant information 232 to individuals related to the user, such as friends or family members. In such instances the user may configure the system so as to identify which related individuals should receive merchant information upon determination that the user is travelling or the system may be configured to determine which related individuals are also travelling with the user based on financial institution transaction data and/or other known location determining means, such as GPS, triangulation, sensors or the like. In addition, the system may be configured to predict which related individuals are travelling with the user based on historical financial institution transaction data.

It should be noted that while in most instances, the merchant information 232 will be received by the user via a mobile device, in other instances, such as when the merchant information 232 is communicated via email or the like, the merchant information 232 may be received by the user via a non-mobile communication device, such as a personal computer or the like.

In specific embodiments, once the merchant information 232 has been communicated and received by the user, the user may choose to forward the information to friends, family members or the like. In one particular instance, sharing of the merchant information 232 may be accomplished by posting the information on a social network web site or the like.

III. Providing Financial Institution Information to Travelling Users

Further embodiments of the invention are directed to apparatus, methods and computer program products for identifying that a user is currently or will be travelling based on the user's financial institution transaction data, identifying travel-related information and communicating the travel-related information to the user. Presently described embodiments take into account the fact that travelling presents unique financial obstacles and/or pitfalls for a user. For example, users that are travelling, especially leisure travelers, typically spend more money than they would when they located at their place of residence. Therefore, travelers/users may benefit from being provided ongoing account balance information while travelling or offers for financial products that lend themselves to travel, such as travel insurance, emergency medical insurance, deposit account protection, misuse of identity protection, loan offers, foreign travel spend card, currency exchange and the like. By automatically recognizing that a user is travelling or planning to travel and subsequently automatically providing such travel-related information, which is associated with the travel, to the user, the present invention provides the user financial awareness and options while travelling without having the user taking any other overt actions to obtain the information.

It should be noted that the certain described embodiments rely solely on the user's financial institution transaction data to determine location and, as such, does not implement any other location-determining means, such as Global Positioning System (GPS), wireless network triangulation, sensors or the like. As such, the user is not required to be in possession of a mobile communication device at the time of the transaction or, stated otherwise, at the time that a user is determined to be travelling. In other embodiments of the invention, location determination may be based on financial institution transaction data in combination with other location-determining means, such as GPS, triangulation, sensors, such as a gyroscope, an earth magnetic field sensor, an air-pressure sensor or the like.

FIG. 3 is a block diagram of an apparatus 300 configured to determine that a user is currently or will be travelling based on financial institution transaction data and provide the user with travel-related information, such as financial institution information, in accordance with embodiments of the present invention. The apparatus includes a computing platform 302 having at least one processor 304 and a memory 306 in communication with processor 304. The memory 306 of apparatus 300 stores travel determination module 308 that is configured to determine that a user 310 is currently or will, in the future, be in travelling. The determination is based on the user's financial institution transactional data 314.

In one embodiment of the invention, the travel determination module 308 is configured to receive POT data 316, such as debit or credit POS transaction data, ATM transaction data or the like. Receipt of the POT data 316 by the transaction receiving entity, such as a financial institution or the like, serves to identify the user 310, by the account number associated with the credit or debit POS account, or the like. The POT data 316 also identifies the location of the POT device from which the transaction data is sent. The location of the POT device (otherwise referred to as the location of the transaction) may be identified by mapping the identifier associated with the POT device to geographic locations of the POT devices or the POT device identifier may, in and of itself, provide for the identity of the geographic location of the POS device.

The travel determination module 308 is further configured to determine that the user is currently travelling based on the transaction occurring a predetermined distance from the user's domicile location. The travel determination module 308 may be configured to access the user's contact information, stored in database, such as an account database or a user contact information database, and compare the domicile/residence location listed in the contact information with the POT location. If the POT location is determined to be a predetermined distance or greater from the domicile location, the user is determined to be travelling. The predetermined distance may be preconfigured by the system provider or, in other embodiments, the predetermined distance may be preconfigured by the user, such that the user controls the distance at which the user is determined to be travelling.

In other embodiments of the invention, the travel determination module 308 is configured to determine that the user has future travel plans based on historical transactions details 318 in the user's financial institution transactional data 314. For example, the transaction details 318, which may indicate a travel location and/or a travel time, may include, but are not limited to, an airline ticket purchase/reservation, a lodging purchase/reservation, a car rental purchase/reservation or the like. Such transaction details 318 may not only provide for indication of the future travel location but also provide for the time period of the pending travel. Information regarding the time period of the pending/future travel may be instrumental in timing the communication of the travel-related information (i.e., communicating the travel-related information proximate to the start of the travel or during the travel).

Memory 306 of apparatus 300 additionally includes travel-related information module 320 that is configured to identify travel-related information associated with the travel and initiate communication of the travel-related information to the user. In specific embodiments of the invention, the travel-related information is financial institution travel-related information 322. Financial institution information 322 may include account balance information 324, e.g., the user's current account balance. In such embodiments, once the user is determined to be travelling, the module 320 is configured to periodically send the user account balance information 324, such as checking/debit account balance information or the like. The system or the user may configure the system to communicate the account balance information 324 on a scheduled basis (e.g., once a day, twice a day, etc.) and/or each time the user conducts a transaction, such as a debit or credit POS account transaction or the like, while traveling.

In additional embodiments of the invention, determination that the user is travelling may trigger the execution of a widget executable on the user's mobile device that provides for continuous tracking and display of the user's current account balance information. In such embodiments, the user may configure the widget to execute and display the account balance continuously throughout the duration of the travel, or the widget may be configured to execute and display the current account balance after each time the user conducts a transaction, such as a POS transaction or the like, while traveling.

In addition, the account balance information may take the form of spend threshold alerts, which are communicated to the user when the user is approaching, meets or exceeds predetermined account thresholds. As such, the user may be notified when they are approaching or have met a predetermined spend limit for the travel, for a spend category (e.g., dining, lodging, entertainment, etc.) or the like.

In alternate embodiments, the financial institution information may include a general transaction information/alert which serves to notify the user that a transaction has occurred. For example, if the user makes a retail purchase using a financial institution debit/credit card, the user may immediately or a short time thereafter be sent an alert that serves to notify the user of the transaction. Since misappropriation of identity activity tends to more prevalent when a user/customer is travelling, a transaction alert serves to notify the user if a dishonest individual is making non-authorized use of the credit/debit account number.

In other embodiments of the invention, the financial institution information includes misuse of identity protection offers 326, which are configured to insure that the user is liable for identity theft losses while travelling; account deposit account discrepancy protection offers 330, which insure that the user is limited or does not incur charges; or other information/offers 332, such as currency exchange offers, emergency medical insurance, travel insurance, foreign travel spend pre-paid card or the like, which may serve to maximize the user's return on currency exchange due to fluctuating rates, loan offers, credit line offers/extensions or the like.

In additional embodiments, the financial institution travel-related information 334 may include notifications sent to the user recommending that the user change and/or confirm financial transaction user preferences, such as transaction amounts requiring authentication, alert notification criteria and the like. Changes to the user's preferences may be desired because travelling tends to provide for an increase in the volume of transactions, as well as an increase in spending. In addition to recommending the preference changes to the user, the notification may provide access, in the form of a hyperlink or the like, to the user's online banking or mobile banking application to make the requisite changes in the user's profile or configuration settings.

In addition, the travel-related information may include other, non-financial institution, travel related information 334, for examples general information about the travel location, maps of the travel location, points of interests at the travel location, and the like.

The system or the user may configure for the travel-related information 322 to be communicated by a designated communication mechanism, such electronic mail (i.e., email), Short Message Service (SMS)/text or the like. The communication may include one or more hyperlinks, which provide for user activation and may, provided that the user's device includes the adequate network connectivity, connect the user to the financial institution's website, a mobile banking site or the like. In specific embodiments of the invention, financial institution information communication may commence shortly after the user has been determined to be currently travelling or determined to be travelling in the future (e.g., shortly after the location-determining transaction occurs at the travel location or after a travel location has been identified from transaction details). The system may be configured to communicate all of the identified financial institution information at one time or the system may be configured to communicate the information periodically, for example, account balance information 324 is typically communicated periodically throughout the duration of the travel.

In addition to communicating the travel-related information 322 to the user, the travel-related information module 320 may be configured to communicate the travel-related information 322 to individuals related to the user, such as friends or family members. In such instances the user may configure the system so as to identify which related individuals should receive merchant information upon determination that the user is travelling or the system may be configured to determine which related individuals are also travelling with the user based on financial institution transaction data and/or other known location determining means, such as GPS, triangulation, sensors or the like. In addition, the system may be configured to predict which related individuals are travelling with the user based on historical financial institution transaction data.

It should be noted that while in most instances, the travel-related information 322 will be received by the user via a mobile device, in other instances, such as when the travel-related information 322 is communicated via email or the like, the travel-related information 322 may be received by the user via a non-mobile communication device, such as a personal computer or the like.

In specific embodiments, once the travel-related information 322 has been communicated and received by the user, the user may choose to forward the information to friends, family members or the like. In one particular instance, sharing of the travel-related information 322 may be accomplished by posting the information on a social network web site or the like.

IV. Predicting Future Travel and Providing Offers Based on the Predicted Travel.

In still further embodiments of the invention, a user's historical financial institution transaction data, including historical travel data, is retrieved and analyzed for the purpose of predicting the user's future travel based on the historical travel data. Once predicted future travel has been determined for the user, predicted travel-related information, such as offers, are identified and communicated to the user. In this regard, if the historical transaction travel data indicates that the user travels to the same destination annually, or more precisely during a particular month or season each year, travel-related information is identified for the travel destination and sent to the user before the particular month or season ensues. As such, embodiments herein described provide the user a pro-active means of planning for travel and/or vacations in advance of the travel.

FIG. 4 is a block diagram of an apparatus 400 configured to predict future travel for a user based on the user's historical financial institution transaction data, specifically travel data, and identify and communicate predicted travel-related information, such as offers or the like, to the user, in accordance with embodiments of the present invention. The apparatus includes a computing platform 402 having at least one processor 404 and a memory 406 in communication with processor 404. The memory 406 of apparatus 400 stores travel prediction module 408 that is predict future travel 416 for a user 410 based on the user's historical financial transaction data 412, specifically, the user's historical travel-related transaction data 414.

The financial institution, or some other entity, stores the user's historical financial institution transaction data 412. The financial institution transaction data 412 includes details related to purchases and the like. The details may include, but are not limited to, the description of the transaction item(s), the date of the transaction, the location of the transaction and the like. The transaction item itself may provide for historical travel transaction data 414. For example, if the transaction item is an airline ticket, a hotel or other lodging, an automobile rental or the like, the transaction item may indicate the destination of the airline travel, the location of the lodging and/or automobile rental or the like. In other instances the location of the transaction, as indicated by the location of the point-of-sale terminal, automated teller machine (ATM) terminal or the like may indicate by the location of the transaction that the user was travelling at the time of the transaction. As such, the prediction module 408 may be configured to determine that any transaction that has occurred more than a predetermined distance from the user's domicile location, as indicated in the user's profile or other personal information database, is a travel transaction. For example, a transaction occurring more than one hundred miles from the user's domicile location may be deemed a travel-related transaction and, as such, the transaction may be used to predict future travel for the user.

In accordance with embodiments of the present invention, predicted future travel 416 may include predicting a future travel destination, predicting a time period for future travel, predicting a future type or brand of transportation, lodging, dining and/or travel-related activity/service or the like. Predicting of a future travel destination or a time period for future travel may be based on a predetermined number of occurrences of a travel and/or occurrence of travel occurring over a predetermined time period. For example, if the user travels for business purposes or otherwise to the same destination on a monthly basis, the prediction module 408 may be configured to predict future travel 416 to the destination for the upcoming month. In other embodiments of the invention, future travel 416 may be predicted by identifying travel patterns in the historical travel transaction data. For example, if the historical travel transaction data indicates that the user travels regularly once every eighteen months, the prediction module 408 recognize such a travel pattern and determine the approximate date (i.e., the impending eighteen month cycle) for the predicted future travel 416.

In addition, historical travel transaction data 414 may indicate the type of transportation that the user prefers when travel, for example, air travel, boat/cruise travel or the like. In another example, the historical travel transaction data 414 may indicate the type/level of lodging/hotel or restaurant that the user prefers, for example, the user always stays at 4-star hotels or higher or the user always dines at fast food restaurants when travelling to one specified location and always dines at upscale/expensive restaurants when travelling to another specific location. Additionally, the historical travel transaction data 414 may indicate the brands that the user prefers, for example, the user prefers Airline A, Hotel Chain B, Car Rental Company C or the like. In addition, the historical travel transaction data 414 may indicate travel-related activities related to the predicted future travel 416. For example, the historical travel transaction data 414 may indicate that the user prefers skiing when travelling to specific travel destinations and prefers spa services when travelling to other specific travel destinations.

The memory 406 of apparatus 400 additionally includes travel information module 418 configured to identify and initiate communication to the user 410 of travel-related information, such as travel-related offers 420 associated with the predicted future travel 416. Travel-related offers 420 may include any discount, offer or the like provided by a merchant, including discounts on products services or the like. In other embodiments, travel-related offers may include advertisements, which may or may not include discounts provided by the advertising merchant. The travel-related offers 420 identified and communicated to the user are dependent on the predicted future travel. For example, if the predict future travel includes a predicted future travel destination, the travel-related offers 420 may be specific to the travel destination 422. For example, if the predicted future travel indicates that the user is predicted to travel to Denver, Colo., the travel-related offers 420 may be specific to providing transportation to Denver or merchants located in Denver, Colo. or within the general vicinity of Denver, Colo.

In another example, if the predicted future travel 416 indicates that the user prefers a specific brand or type of transportation, lodging, dining or the like, the travel-related offers 420 may be specific to the preferred brand 424 or type 426 of transportation, lodging, dining or the like. For example, if the predicted future travel 416 indicates that the user prefers Airline A, the travel-related offers 420 may be specific to Airline A or if the predicted future travel 416 indicates that the user prefers four-star hotel lodging the travel related offers may be specific to four-star or higher hotels. The preferred brand 424 or preferred type 426 may be specific to a travel destination or the brand 424 and/or type 426 may be generic, such that it pertains to all destinations.

In alternate embodiments of the invention, the travel-related offers 420 may be identified for a user based on the brand or type being different than the preferred brand or preferred type determined from the historical transaction travel data 414. For example, if the predicted future travel 416 indicates that the user will likely travel to New York City in the near future and that the user prefers a specific airline and a specific brand or type hotel, some or all of the travel-related offers identified for the user may be for airlines and/or hotel type or brand other than airline or hotel brand or type preferred by the user. In such instances the offer provided to the user may be customized (e.g., a greater discount, a higher percentage off, etc.) to entice the user to try the product or service based on the fact that the airline or hotel brand or type is not the user's preferred airline or hotel type or brand.

In another example, if the predicted future travel 416 indicates that the user prefers a specific travel activity, the travel-related offers 420 may be specific to the preferred travel-related activity 428. For example, if the predicted future travel 416 indicates that the user prefers deep sea fishing in the predicted travel destination of the Caribbean, the travel-related offers 420 may be specific to deep sea fishing. The preferred travel-related activity 428 may be specific to a travel destination or the travel-related activity 428 may be generic, such that it pertains to all destinations.

In additional embodiments of the invention, the travel-related offers 420 may include other offers 430, which are based on the predicted future travel 416 and the historical transaction travel data 414.

Moreover, in further embodiments of the invention, the travel-related offers 420 may be bundled or packaged such that the user may need to redeem or accept all offers in the package in order to realize the discount or realize the highest discount possible. In such embodiments, the packaged or bundled merchant offers 420 may be user-specific merchant offers 420, as described infra.

Additionally, the travel related information may include other, non-offer, travel-related information 432, such as merchant reviews, merchant contact information, general information about the travel location, maps of the travel location, points of interests at the travel location, and the like.

The system or the user may configure for travel-related information 420 to be communicated by a designated communication mechanism, such electronic mail (i.e., email), Short Message Service (SMS)/text or the like. The communication may include one or more hyperlinks, which provide for user activation and may, provided that the user's device includes the adequate network connectivity, connect the user to the information provider's website, a mobile banking site or the like.

In specific embodiments of the invention, communication of the travel-related information 420 may commence shortly after the predicted future travel 416 has been determined. However, in most instances, communication of the travel-related information 420 may commence prior to the start of the predicted future travel 416. As previously noted, in addition to predicting travel destinations, in certain instances the prediction module 408 is able to predict the time period (e.g., approximate day, week, month, season, year or the like) for the predicted future travel 416. In certain embodiments, in which the predicted future travel 416 is predicted well in advance of the predicted time period for the travel, the travel information may be optimized, such that the travel information, such as offers or the like, are communicated to the user at a point in time when the offer/discount is the greatest. For example, airline discounts may be greatest at least thirty days prior to the predicted departure date for the predicted future travel 416 and, as such, airline offers may be communicated prior to the thirty day advance purchase deadline.

In addition to communicating the travel-related information 420 to the user, the travel information module 418 may be configured to communicate the travel-related information 420 to individuals related to the user, such as friends or family members. In such instances the user may configure the system so as to identify which related individuals should receive travel-related information upon prediction of future travel or the system may be configured to predict which related individuals will be travelling with the user based on historical financial institution transaction data.

It should be noted that while in most instances, the travel-related information 420 will be received by the user via a mobile device, in other instances, such as when the travel-related information 420 is communicated via email or the like, the travel-related information 420 may be received by the user via a non-mobile communication device, such as a personal computer or the like.

In specific embodiments, once the travel-related information 420 has been communicated and received by the user, the user may choose to forward the information to friends, family members or the like. In one particular instance, sharing of the travel-related information 422 may be accomplished by posting the information on a social network web site or the like.

Referring to FIG. 5, a schematic diagram is provided of a system 500 for providing travel-related information to users, in accordance with embodiments of the present invention.

In accordance with specific embodiments of the invention, a user 502 conducts a transaction via Point-Of-Transaction (POT) Device 504, for example an POS device, an ATM device or the like. The POT data is communicated across network 506, which may be wired, wireless or a combination wired and wireless network, such as the Internet or the like, to server 508, where POT module 108 (described in relation to FIG. 1) is configured to process the transaction. The POT data, which includes user identifying information (e.g., account number) and POT location information is communicated to server 510 that includes travel location determination module 118 (described in relation to FIG. 1). It should be noted that while server 508 and server 510 are shown and described as separate entities, in other embodiments of the invention servers 508 and 510 may comprise a single entity or the functionality associated with servers 508 and 510 may occur in a single server or multiple servers. The travel location determination module 118 is configured to determine if the POT location is a predetermined distance from the user's domicile location (i.e., a travel location). As such, travel location determination module 118 compares the POT location to the user's domicile location, which is retrieved from user information database 512, such as a financial institution customer database or the like. Once the POT location has been determined to be a travel location (i.e., located a predetermined distance from the user's domicile location), merchant information module 126 (described in relation to FIG. 1) is invoked to identify merchant information, such as offers in the information/offer database 514, which are associated with merchants located proximate to the travel location. While the merchant information module 126 and information/offer database 514 are shown and described as being located at server 516, the merchant information module 126 and/or the information/offer database 514 may reside and/or be executed at any other network device, shown or not shown in FIG. 4, including server 506 and/or server 508. Once the travel location information has been identified, the information is communicated to the user 204, via email, SMS/text or the like, which the user 502 may access via mobile communication device 518 or the like.

In accordance with further specific embodiments of the invention, travel location determination module 208 (described in relation to FIG. 2) executed on server 508 is configured to determine that the user 502 currently is or will be located at a travel location, which is defined as being a predetermined distance from the user's domicile location. Similar to the embodiment described above, in one embodiment travel location determination module 208 may receive POT location information based on the user 502 conducting a transaction at POT device 504. Travel location determination module 208 compares the POT location to the user's domicile location, which is retrieved from user information database 512, such as a financial institution customer database or the like, to determine if the POT location is located the predetermined distance or greater from the user's domicile location. In other embodiments of the invention, the travel location determination module 208 determines that the user 502 will be travelling to a travel location in the future based on financial institution transaction data stored in financial institution transaction database 520. The financial institution transaction data may include receipts, transaction details and the like that indicate an impending airline departure, hotel reservation or the like. Once the POT location has been determined to be a travel location (i.e., located a predetermined distance from the user's domicile location) or the user 502 has been determined to have future travel pending, travel location merchant determination module 220 (described in relation to FIG. 2) is invoked to determine merchants in the travel location that are similar to or the same as merchants used by the user 502. Merchants in the travel location that are similar to or the same as merchants used by the user 502 are determined by accessing the financial institution transaction database 520 to identify merchants previously used by the user and accessing a travel location merchant database 522 to determine which merchants in the travel location are the same or similar to those merchants used by the user. Once the same or similar travel location merchants have been identified by travel location merchant determination module 220, the offer/information module 230 (described in relation to FIG. 2) is executed to identify information stored in offer/information database 514, which is associated with the same or similar merchants. Once the travel merchant information, such as travel merchant offers or the like, is identified, the information is communicated to the user 204, via email, SMS/text or the like, which the user 502 may access via mobile communication device 518 or the like.

In accordance with other specific embodiments of the invention, travel determination module 308 (described in relation to FIG. 3) executed on server 508 is configured to determine that the user 502 currently is or will be traveling based on the user being located or planning on being located a predetermined distance from the user's domicile location. Similar to the embodiment described above, in one embodiment travel determination module 308 may receive POT location information based on the user 502 conducting a transaction at POT device 504. Travel determination module 308 compares the POT location to the user's domicile location, which is retrieved from user information database 512, such as a financial institution customer database or the like, to determine if the POT location is located the predetermined distance from the user's domicile location. In other embodiments of the invention, the travel determination module 308 determines that the user 502 will be travelling in the future based on financial institution transaction data stored in financial institution transaction database 520. The financial institution transaction data may include receipts, transaction details and the like that indicate an impending airline departure, hotel reservation or the like. Once the user has been determined to be travelling based on transaction data or the user 502 has been determined to have future travel pending, travel-related information module 320 (described in relation to FIG. 3) is invoked to identify travel-related information, for example, financial institution travel-related information stored in financial institution information database 524. The financial institution information may include user account balances, financial institution offers, such as misuse of identity protection offers, deposit account discrepancy protection offers, loan offers, currency exchange offers, travel insurance, emergency medical insurance, foreign travel spend cards and the like. Other travel-related information may include general information pertaining to the travel location, maps associated with the travel location, points of interest at the travel location and the like. Once the travel-related information has been identified by financial institution information module 320, the financial institution information is communicated to the user 502, via email, SMS/text or the like, which the user 502 may access via mobile communication device 518 or the like.

In accordance with still further specific embodiments of the invention, travel prediction module 408 (described in relation to FIG. 4) executed on server 508 is configured to predict future travel for the user 502 based on historical financial transaction data stored in financial transaction database 520. The financial institution transaction data includes historical travel data which indicates previous travel dates, previous travel destinations, travel preferences for type and/or brand of transportation, lodging, dining and travel activities and the like. Once predicted future travel has been determined for the user 503, travel information module 418 (described in relation to FIG. 4) is invoked to identify travel information stored in information/offer database 514, which are associated with the predicted travel. Once the predicted travel information has been identified by travel offer module 418, the predicted travel-related information, such as offers or the like is communicated to the user 502, via email, SMS/text or the like, which the user 502 may access via mobile communication device 518 or the like.

Turning the reader's attention to FIG. 6 a flow diagram is presented of a method 600 for determining that a user is at travel location based on Point-of-Transaction (POT) data and providing travel location information, such as merchant offers to the user, in accordance with embodiments of the invention. At Event 610, POT data is received that indicates that a user is conducting a transaction. A POT transaction may include, but is not limited to, a POS transaction, such as a POS debit card transaction, a credit card transaction or the like. Additionally, POT transactions may include Automated Teller Machine transactions, such as balance inquiries, withdrawals, deposits or the like.

At Event 604, the user is currently determined to be located at a travel location based on the transaction occurring a predetermined distance from the user's domicile location. In this regard, the method compares the POT transaction location, as indicated within the POT data, to the user's domicile location stored in a user information database, such as a customer information/profile database or the like and determines if the distance between the two locations is equal to or greater than the predetermined distance that defines a travel location.

At Event 606, merchant information is identified, such that the merchant associated with the information is proximate in distance to the travel location. In specific embodiments of the invention in which the merchant information is merchant offers, the merchants associated with the merchant offers are affiliated with the financial institution that conducts the user's transaction. In such embodiments, the financial institution provides a merchant offer program that provides merchant offers to their customers.

In specific embodiments of the method, the identified merchant information is further defined as user-specific merchant information. In such embodiments, the method may further include accessing the user's financial institution transaction data to determine user-specific merchant information. The user's financial institution transaction data provides insight into the user's preference for a product type or service type, a preferred price range or price point for a product or service. In specific embodiments, the user-specific merchant information is associated with merchants that are similar to or the same as merchants previously used by the user, as determined from the financial institution transaction data.

In further specific embodiments of the method, the merchant information, for example, merchant offers are identified based on the product or service type associated with the location determining transaction. In other words, the identification of the merchant offers at the travel location will take into account the type of product/service currently being purchased at the travel location.

At Event 640, the merchant information is communicated to the user. In specific embodiments the user may configure the system to communicate the information via a chosen communication mechanism, such as email, SMS/text or the like. In specific embodiments the merchant information is communicated to the user in real-time, wherein real-time is defined as the computing time necessary to determine that user is located at a travel location based on the transaction data and identify the merchant information associated with merchants that are proximate in location to the travel location.

Referring to FIG. 7 a flow diagram is presented of a method 700 for determining that a user is at or will be at a travel location, determining merchants at the travel location that or the same or similar to merchants used by the user and providing merchant information, including offers to the user, in accordance with embodiments of the invention. At Event 710, the user is determined to be currently located at a travel location or will be located at a travel location that is a predetermined distance from the user's domicile location. The travel location determination is based on the user's financial institution transaction data. Similar to the method described in relation to FIG. 6, in one embodiment the travel location is determined by comparing a current transaction location, as indicated within received POT data, to the user's domicile location stored in a user information database, such as a customer information/profile database or the like and determining if the distance between the two locations is equal to or greater than a predetermined distance that defines a travel location. In another embodiment of the method, a future travel location is determined based on information in the user's financial institution transaction data, such as airline bookings, hotel reservations, etc.

At Event 720, one or more travel location merchants are identified that are the same or similar to merchants used previously by the user. The determination is made by accessing the user's financial institution transaction to determine which merchants have been previously used and comparing the previous used merchants to merchants in the travel location. Similar merchants may be defined as similar in price, product type, service classification or the like. In specific embodiments of the invention, the merchants determined to be the same or similar may be affiliated with the financial institution.

At Event 730, travel information is identified that is associated with the one or more merchants in the travel location that have been determined to be the same or similar to merchants used by the user. It should be noted that while Events 720 and 730 are described at separate events, in other embodiments, Events 720 and 730 may be combined such that the determination of same or similar merchants includes the determination of same or similar merchants that currently have available information, for example available offers. The identified travel information may include, but is not limited to, merchant offers, merchant reviews, merchant contact information, merchant advertisements and the like. In further specific embodiments of the invention the merchant reviews may be provided by individuals known by the user, which may identified through social networking websites or the like.

At Event 740, the merchant information is communicated to the user. In specific embodiments the user may configure the system to communicate the merchant information via a chosen communication mechanism, such as email, SMS/text or the like. In specific embodiments the merchant information is are communicated to the user in real-time, wherein real-time is defined as the computing time necessary to determine that a user is located at a travel location or will be located at a travel location, determine same or similar merchants at the travel location and identify the merchant information associated with the same or similar merchants.

Referring to FIG. 8 a flow diagram is presented of a method 800 for determining that a user is travelling or will be travelling and providing travel-related information to a user based on the travelling determination, in accordance with embodiments of the invention. At Event 810, the user is determined to be currently travelling or will be travelling a predetermined distance from the user's domicile location. The travel determination is based on the user's financial institution transaction data. Similar to the method described in relation to FIG. 7, in one embodiment a travelling user is determined by comparing a current POT location, as indicated within received POT data, to the user's domicile location stored in a user information database, such as a customer information/profile database or the like and determining if the distance between the two locations is equal to or greater than a predetermined distance that defines a travel location. In another embodiment of the method, future travel is determined based on information in the user's financial institution transaction data, such as airline bookings, hotel reservations, etc.

At Event 820, travel-related information is identified based on the user being determined to be travelling or will be travelling. In specific embodiments the travel-related information is further defined as financial institution travel-related information. The financial institution information may be account related information, such account balances, spend limits or the like. Additionally, the financial institution information may be offers, such as misuse of identity protection offers, deposit account discrepancy protection offers, loan offers, currency exchange offers, travel insurance, emergency medical insurance, foreign travel spend cards or the like.

At Event 830, the travel-related information is communicated to the user. In specific embodiments the user may configure the system to communicate the financial institution information via a chosen communication mechanism, such as email, SMS/text or the like. In specific embodiments the financial institution information is communicated to the user in real-time, wherein real-time is defined as the computing time necessary to determine that a user is travelling or will be travelling and identify the travel-related information associated with the travel. In other embodiments, such as when the travel-related information is financial institution account balance information, the account balance information may be communicated to the user during the duration of the travel, for example, each time the user conducts a POT or POS transaction while travelling.

Referring to FIG. 9 a flow diagram is presented of a method 900 for predicting future travel for a user based on historical financial institution transaction data and providing travel-related offers to the user based on the predicted future travel, in accordance with embodiments of the invention. At Event 910, the user's historical financial transaction data is retrieved from a financial institution transactional database. The financial institution transaction data 412 includes details related to purchases and the like. The details may include, but are not limited to, the description of the transaction item(s), the date of the transaction, the location of the transaction and the like. The transaction item itself may provide for historical travel transaction data 414. For example, if the transaction item is an airline ticket, a hotel or other lodging, an automobile rental or the like, the transaction item may indicate the destination of the airline travel, the location of the lodging and/or automobile rental or the like. In other instances the location of the transaction, as indicated by the location of the point-of-sale (POS) terminal, automated teller machine (ATM) terminal or the like may indicate, by the location of the transaction that the user was travelling at the time of the transaction.

At Event 920, future travel is predicted for the user based on historical travel data in the user's financial institution transaction data. Predicting future travel may include determining that any transaction that has occurred more than a predetermined distance from the user's domicile location, as indicated in the user's profile or other personal information database, is a travel transaction. For example, a transaction occurring more than one hundred miles from the user's domicile location may be deemed a travel-related transaction and such a transaction may be used to predict future travel for the user. Predicting future travel may include predicting a future travel destination, predicting a time period for future travel, predicting a future type or brand of transportation, lodging, dining and/or travel-related activity/service or the like. Predicting of a future travel destination or a time period for future travel may be based on a predetermined number of occurrences of a travel and/or occurrence of travel occurring over a predetermined time period. In other embodiments of the invention, future travel may be predicted by identifying travel patterns in the historical travel transaction data.

At Event 930, travel information is identified based on the user's predicted future travel. Travel information may include travel offers, discounts or other information provided by a merchant, including discounts on products services or the like. In other embodiments, travel information may include advertisements, which may or may not include discounts provided by the advertising merchant. The travel information identified is dependent on the predicted future travel. For example, if the predict future travel includes a predicted future travel destination, the travel information may be specific to the travel destination. In another example, if the predicted future travel indicates that the user prefers a specific brand or type of transportation, lodging, dining or the like, the travel-related information, such as offers or the like, may be specific to the preferred brand or type of transportation. In another example, if the predicted future travel indicates that the user prefers a specific travel activity, the travel-related information, such as offers or the like, may be specific to the preferred travel-related activity.

At Event 940, the travel information is communicated to the user. In specific embodiments the user may configure the system to communicate the travel information via a chosen communication mechanism, such as email, SMS/text or the like. In specific embodiments the travel information may be communicated to the user in real-time, wherein real-time is defined as the computing time necessary to predict the future travel and identify the related travel information. In other embodiments, the travel information may be communicated proximate in time to the predicted time for travel.

Thus, embodiments previously disclosed provide for providing travel-location merchant offers to users who are determined to be travelling based on Point-Of-Transaction (POT) data. Embodiments of the invention compare the location of the transaction to the user's domicile location and if the transaction occurs a predetermined distance or greater from the domicile location, the user is determined to be travelling. Once the travelling determination is made, travel-location merchant information, such as merchant offers or the like, is identified and communicated to the user.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for providing travel-related information to a predicted traveler, the method comprising:
    retrieving, via a computing device processor, a user's historical financial institution transaction data including historical travel data comprising one or more travel locations and associated travel dates;
    predicting, via a computing device processor, a future travel comprising a date, a travel destination, and travel-related activities associated with the predicted future travel destination for the user based on the historical travel data, wherein the future travel destination is predicted based on the historical travel data indicating a predetermined number of previous travels by the user to the future travel destination, and wherein the predetermined number is greater than or equal to two;
    identifying, via a computing device processor, travel-related information associated with the predicted future travel date, the predicted future travel destination and the travel-related activities; and
    communicating, via a computing device, the travel-related information to the user proximate in time to the predicted travel date.

2. The method of claim 1, wherein predicting future travel further comprises predicting, via the computing device processor, the future travel based on the historical travel data indicating a predetermined number of travels occurring over a predetermined time period.

3. The method of claim 1, wherein predicting future travel further comprises identifying, via the computing device processor, travel patterns in the historical travel data and predicting, via the computing device processor, the future travel based on the identified travel patterns.

4. The method of claim 1, wherein identifying further comprises identifying, via the computing device, the travel-related information, wherein the travel-related information is related to one or more alternate destinations similar to the future travel destination.

5. The method of claim 1, wherein predicting the future travel further comprises predicting, via the computing device processor, at least one of a brand or type of transportation, a brand or type of lodging or a brand or type of dining for the future travel.

6. The method of claim 5, wherein identifying further comprises identifying, via the computing device, the travel-related information associated with the brand or type of transportation, the brand or type of lodging or the brand or type of dining.

7. The method of claim 5, wherein identifying further comprises identifying, via the computing device, the travel-related information associated with an alternate brand or type to the brand or type of transportation, an alternate brand or type to the brand or type of lodging or an alternate brand or type to the brand or type of dining.

8. An apparatus configured for providing travel-related information to a predicted traveler, the apparatus comprising:
  a computing platform including a memory and at least one processor in communication with the memory;
  a travel prediction module stored in the memory, executable by the processor and configured to retrieve a user's historical financial institution transaction data including historical travel data comprising one or more travel locations and associated travel dates and predict future travel comprising a date, a travel destination, and travel-related activities associated with the predicted future travel destination for the user based on the historical travel data, wherein the future travel destination is predicted based on the historical travel data indicating a predetermined number of previous travels by the user to the future travel destination, and wherein the predetermined number is greater than or equal to two; and
  a travel information module stored in the memory, executable by the processor and configured to identify travel-related information associated with the predicted future travel date, the predicted future travel destination and the travel-related activities and initiate communication of the travel-related information to the user proximate in time to the predicted travel date.

9. The apparatus of claim 8, wherein the travel prediction module is further configured to predict the future travel based on the historical travel data indicating a predetermined number of travels occurring over a predetermined time period.

10. The apparatus of claim 8, wherein the travel prediction module is further configured to identify travel patterns in the historical travel data and predict the future travel based on the identified travel patterns.

11. The apparatus of claim 8, wherein the travel information module is further configured to identify the travel-related information, wherein the travel-related information is related to one or more alternate destinations similar to the travel destination.

12. The apparatus of claim 8, wherein the travel prediction module is further configured to predict at least one of a brand or type of transportation, a brand or type of lodging or a brand or type of dining for the future travel.

13. The apparatus of claim 12, wherein the travel information module is further configured to identify the travel-related information, wherein the travel-related information is associated with the brand or the type of transportation, the brand or the type of lodging or the brand or the type of dining.

14. The apparatus of claim 12, wherein the travel information module is further configured to identify the travel-related information, wherein the travel-related information is associated with an alternate brand or type to the brand or type of transportation, an alternate brand or type to the brand or type of lodging or an alternate brand or type to the brand or type of dining.

15. A computer program product including a non-transitory computer-readable medium, the medium comprising:
  a first set of codes for causing a computer to retrieve a user's historical financial institution transaction data including historical travel data comprising one or more travel locations and associated travel dates;
  a second set of codes for causing a computer to predict future travel comprising a date, a travel destination, and travel-related activities associated with the predicted future travel destination for the user based on the historical travel data, wherein the future travel destination is predicted based on the historical travel data indicating a predetermined number of previous travels by the user to the future travel destination, and wherein the predetermined number is greater than or equal to two;
  a third set of codes for causing a computer to identify travel-related information associated with the predicted future travel date, the predicted future travel destination and the travel-related activities; and
  a fourth set of codes for causing a computer to initiate communication of the travel-related information to the user proximate in time to the predicted travel date.

16. The computer program product of claim 15, wherein the second set of codes is further configured to cause the computer to predict the future travel based on the historical travel data indicating a predetermined number of travels occurring over a predetermined time period.

17. The computer program product of claim 15, wherein the second set of codes is further configured to cause the computer to identify travel patterns in the historical travel data and predict the future travel based on the identified travel patterns.

18. The computer program product of claim 15, wherein the third set of codes is further configured to cause the computer to identify the travel-related information, wherein the travel-related information is related to one or more alternate destinations similar to the travel destination.

19. The computer program product of claim 15, wherein the second set of codes is further configured to cause the computer to predict at least one of a brand or a type of transportation, a brand or a type of lodging or a brand or a type of dining for the future travel.

20. The computer program product of claim 19, wherein the third set of codes is further configured to cause the computer to identify the travel-related information, wherein the travel-related information is associated with the brand or the type of transportation, the brand or the type of lodging or the brand or the type of dining.

21. The computer program product of claim 19, wherein the third set of codes is further configured to cause the computer to identify the travel-related information, wherein the travel-related information is associated with an alternate brand or type to the brand or the type of transportation, an alternate brand or type to the brand or the type of lodging or an alternate brand or type to the brand or the type of dining.

* * * * *